United States Patent [19]
Lai

[11] Patent Number: 5,509,328
[45] Date of Patent: Apr. 23, 1996

[54] ADJUSTABLE UPRIGHT TUBE OF A BICYCLE HANDLEBAR

[76] Inventor: Yung-Hsin Lai, No. 302-1 Chang Yuan Road, Chang Sha Village, Hwatan, Chang Hwa, Taiwan

[21] Appl. No.: 383,177

[22] Filed: Feb. 3, 1995

[51] Int. Cl.$^6$ .................................................... B62K 21/14
[52] U.S. Cl. ........................ 74/551.3; 74/551.1; 280/279
[58] Field of Search ................................ 74/551.1, 551.2, 74/551.3, 551.4, 551.5, 551.6, 551.7, 551.8; 280/279, 280; 403/83, 84, 97, 110, 298

[56] References Cited

U.S. PATENT DOCUMENTS

| | | | |
|---|---|---|---|
| 2,484,551 | 10/1949 | Brouse | 403/104 |
| 4,939,950 | 7/1990 | Girvin | 74/551.1 |

*Primary Examiner*—Charles A. Marmor
*Assistant Examiner*—Chong H. Kim
*Attorney, Agent, or Firm*—Browdy and Neimark

[57] ABSTRACT

A bicycle handlebar upright tube assembly comprises a head tube, a handlebar upright tube, and an adjusting device. The head tube is fastened at the bottom end thereof with a front fork and at the top end thereof with two lugs. Each of the two lugs is provided with a fitting hole. The handlebar upright tube is provided at one end thereof with a fastening tube for fastening the bicycle handlebar and at another end thereof with a pivoting portion provided with a fitting hole. The adjusting device comprises a braking member and a shaft. The braking member is disposed in the fitting hole of the pivoting portion and is provided with an axial hole dimensioned to receive therein the shaft. The handlebar upright tube and the head tube are joined together adjustably such that the shaft of the adjusting member is received in the fitting holes of the two lugs of the head tube and in the axial hole of the braking member of the adjusting device.

7 Claims, 4 Drawing Sheets

1

ADJUSTABLE UPRIGHT TUBE OF A BICYCLE HANDLEBAR

FIELD OF THE INVENTION

The present invention relates generally to a bicycle, and more particularly to an adjustable upright tube of the bicycle handlebar.

BACKGROUND OF THE INVENTION

As shown in FIG. 1, a prior art bicycle handlebar upright tube 93 is provided at one end thereof with slot 94 having in the midsegment thereof a slot hole 95 corresponding in location to and engageable with two parallel planar surfaces 92 located at the top of a bicycle head tube 91. The handlebar upright tube 93 and the bicycle head tube 91 can be fastened or unfastened by means of a fastening member 98 so as to allow a bicyclist to adjust the angular position of the handlebar upright tube 93 without the help of a hand tool. However, such a prior art means of fastening the handlebar upright tube 93 with the head tube 91 as described is defective in design in that the construction of the two parallel planar surfaces 92 of the head tube 91 and the construction of the slot hole 95 of the handlebar upright tube 93 are rather complicated and are therefore not cost-effective. In addition, the construction of the fastening member 98 is such that it can be interfered with by a foreign object.

SUMMARY OF THE INVENTION

It is therefore the primary objective of the present invention to provide an adjustable bicycle handlebar upright tube, which is simple and beautiful in construction and is cost-effective.

The foregoing objective of the present invention is attained by a bicycle handlebar upright tube assembly, which comprises a head tube, a handlebar upright tube, and an adjusting device. The head tube is fastened at the bottom end thereof with a front fork and at the top end thereof with two lugs. Each of the two lugs is provided with a fitting hole. The handlebar upright tube is provided at one end thereof with a fastening tube for fastening the bicycle handlebar and at another end thereof with a pivoting portion which has a fitting hole. The adjusting device comprises a braking member and a shaft. The braking member is disposed in the fitting hole of the pivoting portion and is provided with an axial hole dimensioned to receive therein the shaft. The handlebar upright tube and the head tube are joined together adjustably such that the shaft of the adjusting member is received in the fitting holes of the two lugs of the head tube and in the axial hole of the braking member of the adjusting device.

2

Figure 7:
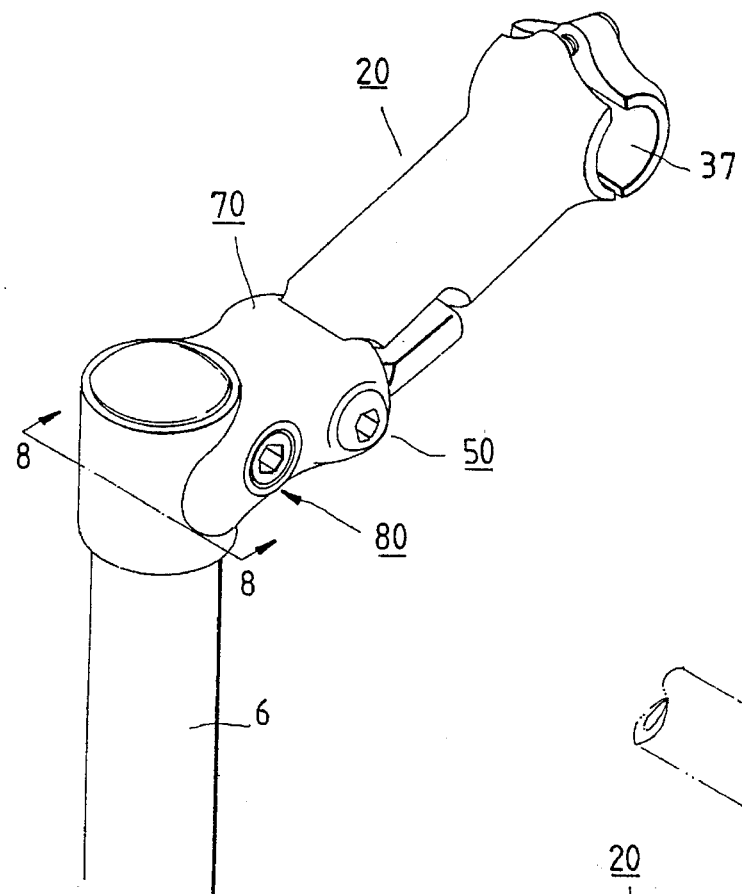

FIG. 7 shows a perspective view of the second preferred embodiment in combination according to the present invention.

Figure 8:
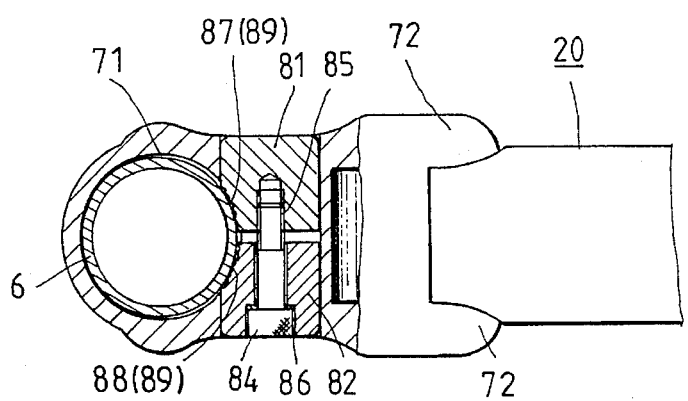

FIG. 8 shows a sectional view of a portion taken along the line 8—8 as shown in FIG. 7.

DETAILED DESCRIPTION OF THE INVENTION

Figure 2:
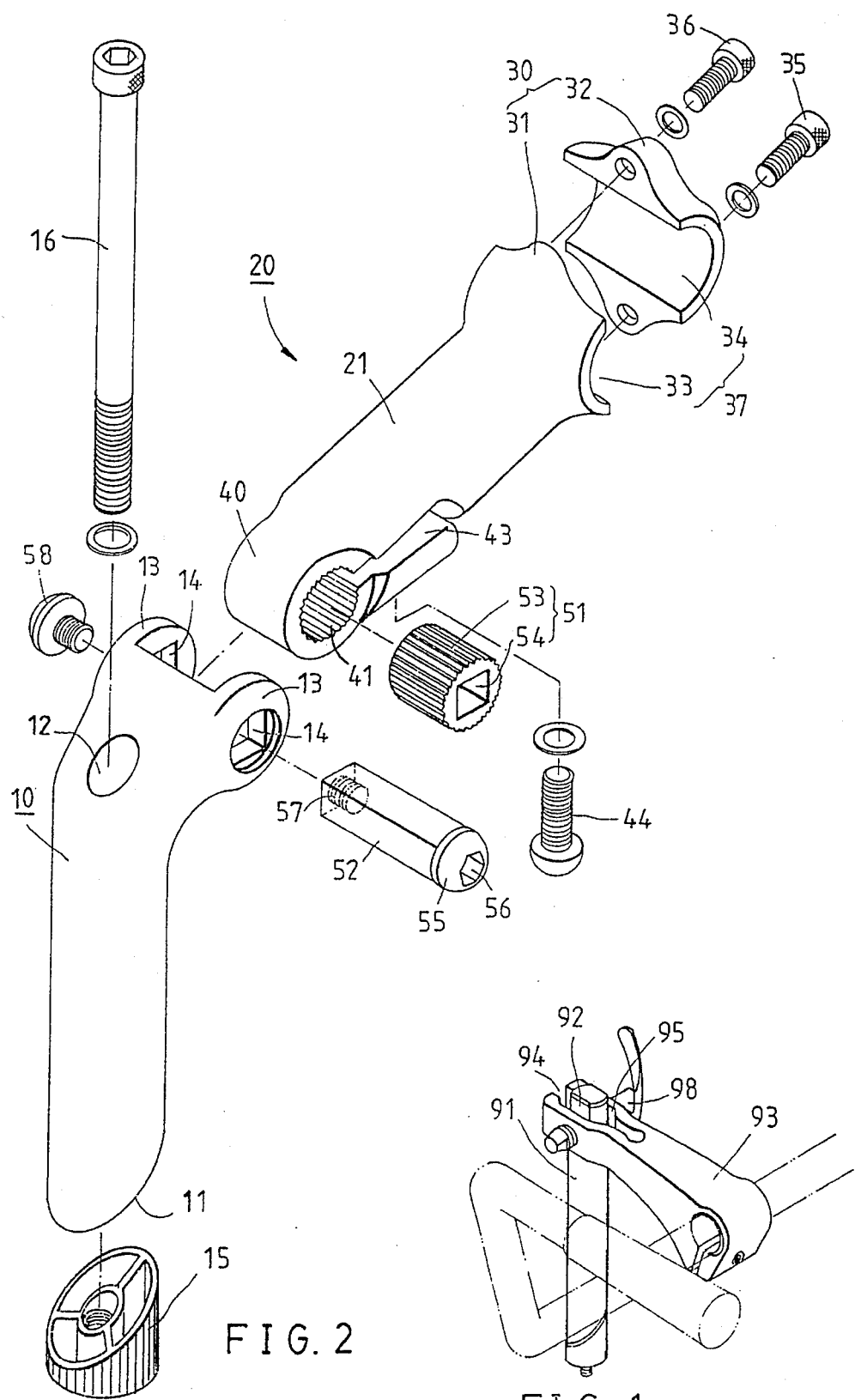
FIG. 2 shows an exploded view of a bicycle handlebar upright tube assembly of the present invention.
Figure 1:
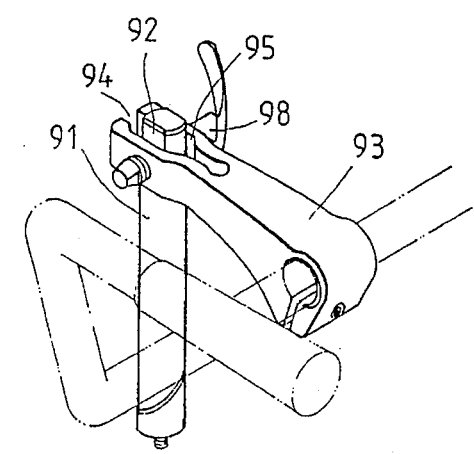
FIG. 1 shows a schematic view of a bicycle handlebar upright tube assembly of the prior art.
Figures 3, 4:
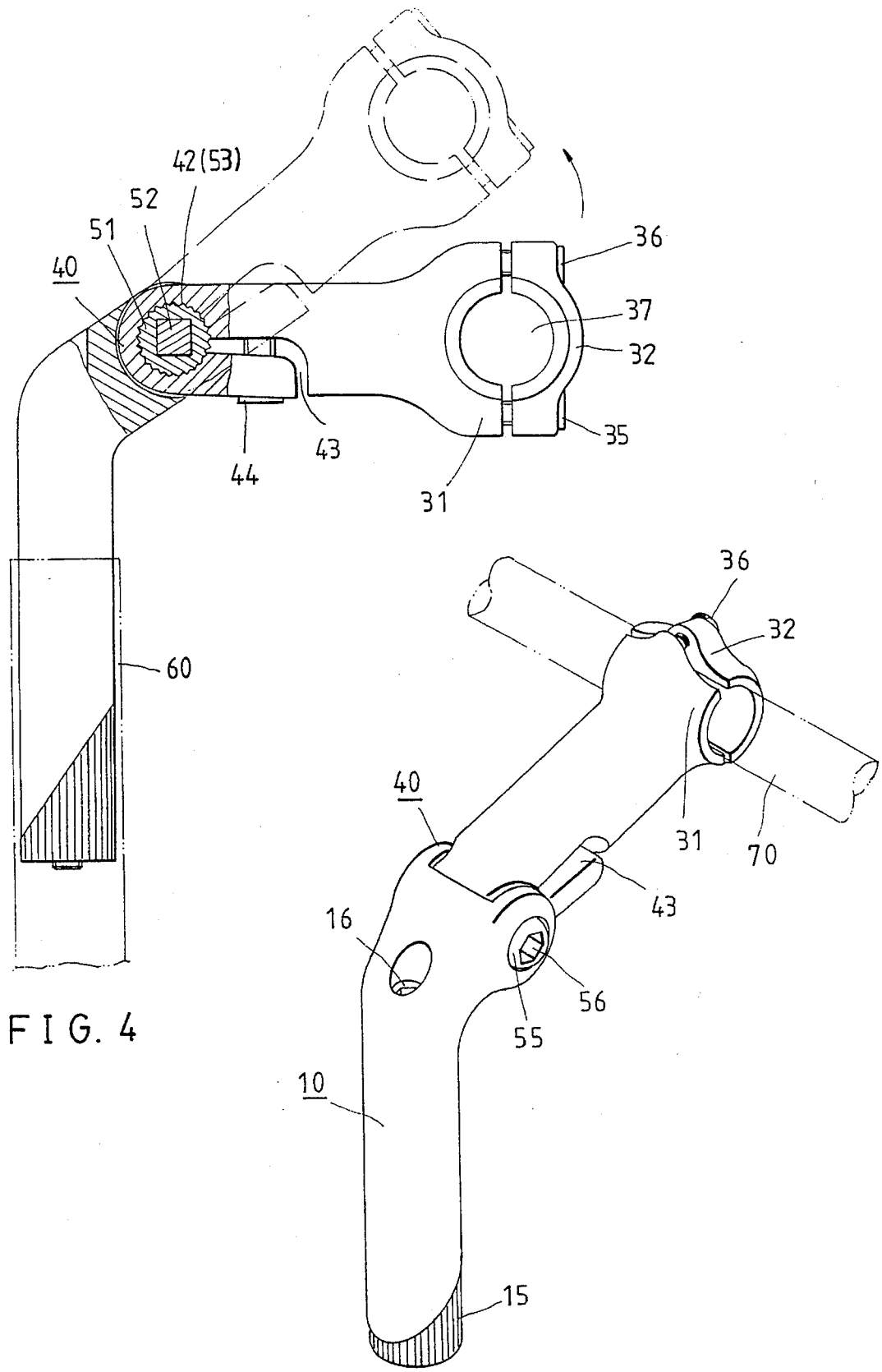
FIG. 3 shows a perspective view of the present invention in combination.
FIG. 4 shows a schematic view of a first preferred embodiment in action according to the present invention.

As shown in FIGS. 2 and 3, an adjustable bicycle handlebar upright tube assembly comprises a head tube 10, an upright tube 20, and an adjusting device 50.

The head tube 10 of a hollow construction is provided at the bottom thereof with a bevel 11 and at the upper end portion thereof with a through hole 12. The head tube 10 is further provided at the top end thereof with two circular lugs 13, which are in turn provided respectively with a fitting hole 14 having a square cross section. The fitting hole 14 is axially perpendicular to the through hole 12. The bevel 11 of the head tube 10 is fastened with a bicycle front fork in conjunction with a fastening block 15 and a fastening bolt 16.

The handlebar upright tube 20 comprises an extension rod 21 provided at the front end thereof with a fastening tube 30 and at the rear end thereof with a pivoting portion 40. The fastening tube 30 comprises a first fastening head 31 and a second fastening head 32, which are provided oppositely and respectively with semicircular slots 33 and 34. The two fastening heads 31 and 32 are fastened together by means of two bolts 35 and 36 such that the two semicircular slots 33 and 34 are joined together to form a circular through hole 37 in which a bicycle handlebar is held. The pivoting portion 40 is received between the two lugs 13 and is provided with a fitting hole 41 having a serrated inner wall 42. The extension rod 21 is further provided with an arcuate tangent slot 43 in which a bolt 44 is so received as to cause the serrated inner wall 42 of the fitting hole 41 to have an urging effect.

The adjusting device 50 comprises a braking member 51 and a shaft 52. The braking member 51 of a round rod-like construction has a diameter smaller than the inner diameter of the fitting hole 41 of the pivoting portion 40. The braking member 51 further has a serrated outer wall 53 and an axial hole 54 which is square in its cross section. The shaft 52 is shaped and dimensioned to fit into the two fitting holes 14 of the two lugs 13 of the head tube 10. The shaft 52 is provided at one end thereof with a protuberance 55 and at another end thereof with a threaded hole 57. The protuberance 55 is provided axially with a hexagonal hole 56.

In combination, the braking member 51 is first disposed in the fitting hole 41 of the pivoting portion 40 before the pivoting portion 40 is disposed between the two lugs 13 of the head tube 10 in such a manner that the two fitting holes 14 of the two lugs 13 are aligned with the axial hole 54 of the braking member 51. Thereafter, the shaft 52 is fitted into the fitting holes 14 and the axial hole 54 such that the protuberance 55 of the shaft 52 urges the outer edge of the fitting hole 13. The handlebar upright tube 20 is therefore fastened with the head tube 10 by means of a bolt 58 engageable with the threaded hole 57 of the shaft 52 such that the head tube 10 can not be turned in relation to the braking member 51. The bolt 44 is finally fastened so as to cause the serrated inner wall 42 of the fitting hole 41 to engage securely the serrated outer wall 53 of the braking member 51, as shown in FIG. 4. As a result, the head tube 10 and the handlebar upright tube 20 can not be turned in relation to each other in view of the fact that the pivoting portion 40 and the braking member 51 are engaged securely with each other.

The handlebar upright tube 20 of the present invention is similar to the prior art handlebar upright tube in that the fastening block 15 of the head tube 10 can be inserted into a bicycle front fork 4 before the bolt 16 is fastened to cause the bevel 11 of the head tube 10 to make an intimate contact with a slanted upper surface of the fastening block 15.

The bicycle handlebar can be adjusted easily in height and angle by unfastening the bolt 44 located at the bottom end of the extension rod 21 of the upright tube 20. As a result, the upright tube 20 can be swiveled as desired. As the desired position of the upright tube 20 is set, as indicated by the dotted lines in FIG. 4, the bolt 44 is fastened. It must be noted here that the bolt 44 is so located that there is a sufficient maneuvering space between the bolt 44 and the head tube 10 for a wrench to work on the bolt 44. In addition, the bolt 44 is located at the bottom of the extension rod 21 such that the bottom end of the extension rod 21 can not be obstructed by the head tube 10 when the upright tube 20 is adjusted in its angular position. In other words, the handlebar upright tube 20 can be angularly adjusted in a wider range.

The present invention is superior to the prior art in that the former is provided with the fastening tube 30 comprising the first fastening head 31 and the second fastening head 32, which can be disengaged with each other by unfastening the bolts 33 and 34, thereby permitting the old bicycle handlebar to be replaced by a new one easily and quickly without having to dismantle the brake lever, the derailleur, etc.

Figure 5:
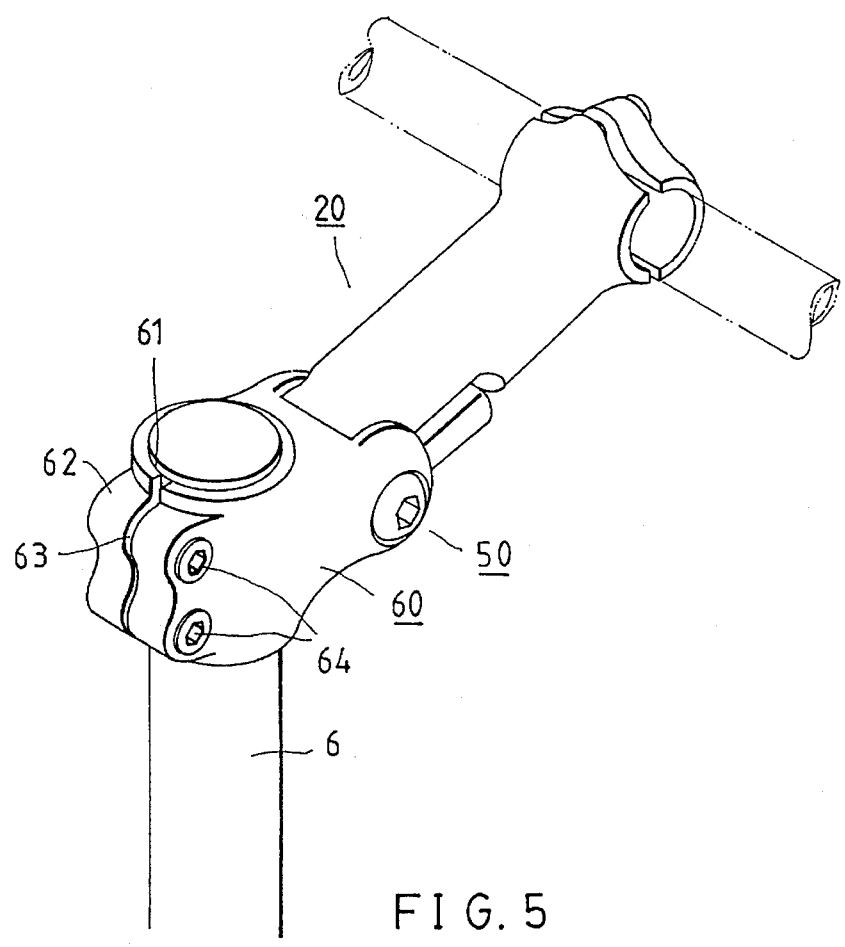
FIG. 5 shows a perspective view of a second preferred embodiment of the present invention.

As shown in FIG. 5, the second preferred embodiment of the present invention is different from the first preferred embodiment of the present invention in that the former comprises a head tube 60 which is provided with a through hole 61 engageable with an upright rod 6 of the front fork 4. The through hole 61 is provided respectively on both sides thereof with a projection 62 having a tangent slot 63 located centrally so as to be in communication with the through hole 61. When the head tube 60 is fastened with the upright rod 6 of the front fork 4, the two projections 62 are pressed against by two bolts 64 to ensure that the head tube 60 and the upright rod 6 are fastened securely.

Figure 6:
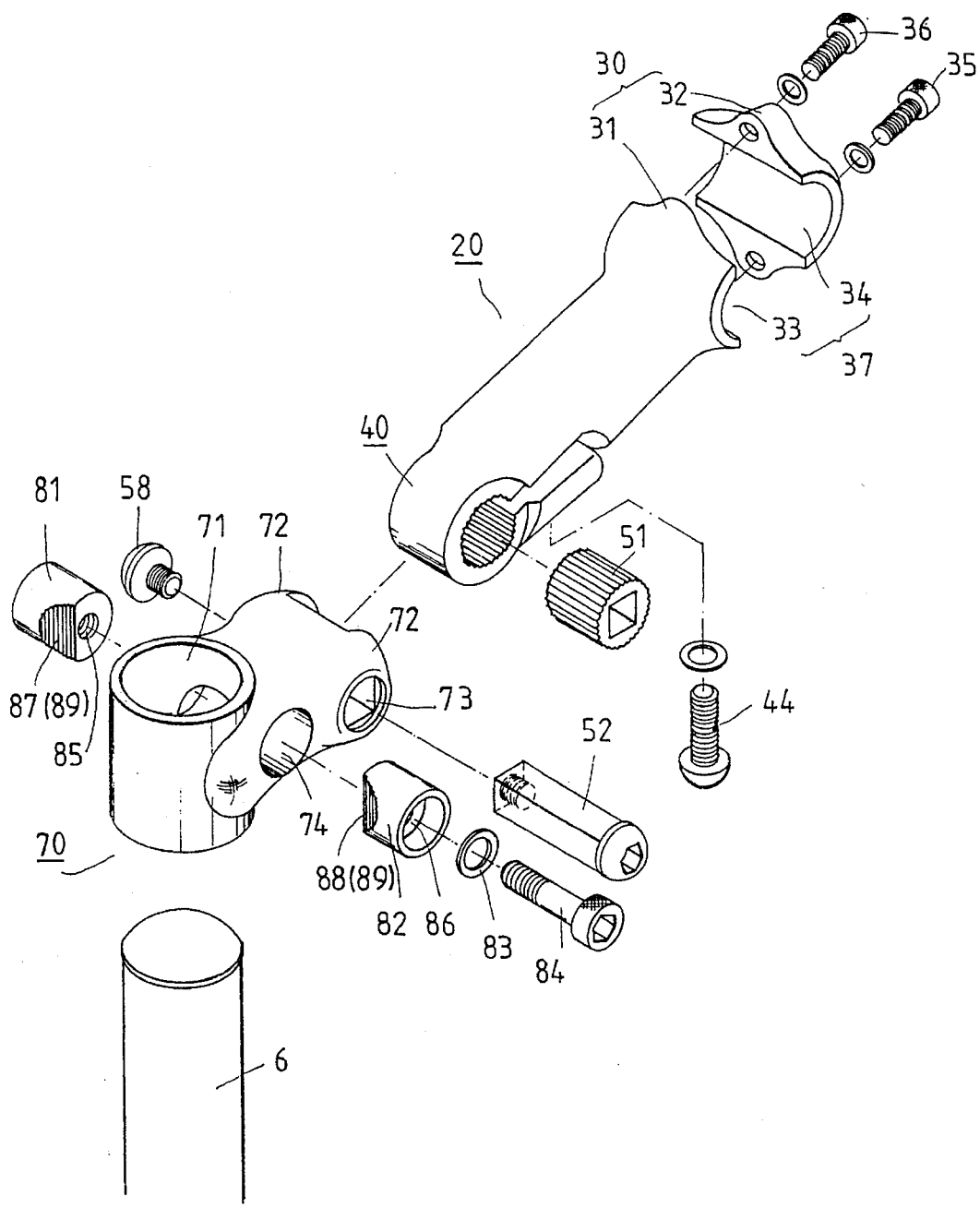
FIG. 6 shows an exploded view of a third preferred embodiment of the present invention.

As shown in FIGS. 6 and 7, the third preferred embodiment of the present invention is different from the first preferred embodiment in that the former comprises a head tube 70 having a through hole 71 engageable with the upright rod 6 of the front fork. The head tube 70 is provided with two circular lugs 72 extending outwards and parallel to each other. The two circular lugs 72 are provided respectively with a fitting hole 73, which is axially perpendicular to the through hole 71. Located at the junction between the through hole 71 of the head tube 70 and the circular lug 72 is a connection hole 74 in communication with the through hole 71 of the head tube 70. The connection hole 74 is dimensioned to receive therein a pressing device 80 which comprises a first pressing member 81, a second pressing member 81, a washer 83, and a bolt 84. The first and the second pressing members 81 and 82 are provided respectively and axially with a threaded hole 85 and a stepped round hole 86, which are engageable respectively with the bolt 84 and the washer 83. The first and the second pressing member 81 and 82 are further provided respectively with arcuate round recesses 87 and 88, which are provided respectively with a serrated surface 89. The third preferred embodiment of the present invention is characterized in that the recesses 87 and 88 of the two pressing members 81 and 82 are forced to engage securely the upright rod 6 of the front fork 4 when the bolt 84 is fastened, as shown in FIG. 8. As a result, the head tube 80 and the front fork 4 are fastened securely. In addition, the serrated surfaces 89 of the recesses 87 and 88 of the first and the second pressing members 81 and 82 serve to reinforce the fastening effect.

What is claimed is:

1. A bicycle handlebar upright tube assembly comprising:

a head tube fastened at a bottom end thereof with a bicycle front fork and provided at a top end thereof with two lugs extending in a predetermined direction and parallel to each other, said two lugs provided axially and respectively with a fitting hole having a polygonal cross section;

an upright tube comprising an extension rod provided at a front end thereof with a fastening tube for holding securely a bicycle handlebar, said extension rod further provided at a rear end thereof with a pivoting portion having a fitting hole which is in turn provided in the wall thereof with an arcuate tangent slot extending toward the bottom edge of said extension rod and engageable with a bolt;

a metal braking member of a substantially cylindrical construction and disposed in said fitting hole of pivoting portion, said braking member provided with an axial hole corresponding in dimension and cross section to said fitting hole of said lugs of said head tube; and a metal shaft having a cross section corresponding to and engageable with said fitting holes of said two lugs and with said axial hole of said braking member such that both ends of said shaft are fastened with said two lugs.

2. The bicycle handlebar upright tube assembly as defined in claim 1, wherein said fitting hole of said pivoting portion of said upright tube is provided with a serrated inner wall; and wherein said braking member is provided with a serrated outer wall engageable with said serrated inner wall of said fitting hole of said pivoting portion of said upright tube.

3. The bicycle handlebar upright tube assembly as defined in claim 1, wherein said fitting hole of said lugs has a square cross section.

4. The bicycle handlebar upright tube assembly as defined in claim 1, wherein said shaft is provided at one end thereof with a protuberance greater in cross section than said fitting hole of one of said two lugs and having on an outer side thereof a hexagonal hole, said shaft further provided at another end thereof with a threaded hole.

5. The bicycle handlebar upright tube assembly as defined in claim 1, wherein said fastening tube of said upright tube comprises a first fastening head and a second fastening head, which are provided oppositely and respectively with a semicircular slot and are engageable with each other such that the semicircular slots of said first fastening head and said second fastening head form a circular through hole dimensioned to receive therein a bicycle handlebar.

6. The bicycle handlebar upright tube assembly as defined in claim 1, wherein said head tube is provided with a through hole dimensioned to receive therein securely an upright rod of said bicycle front fork, said through hole of said head tube provided with a projection extending outwards and having a tangent slot in communication with said through hole and engageable with a bolt for fastening said head tube with said upright rod of said bicycle front fork.

7. The bicycle handlebar upright tube assembly as defined in claim 1, wherein said head tube has a through hole for holding therein an upright rod of said bicycle front fork and further has a connection hole located at a junction between said through hole and said two lugs, said connection hole being axially perpendicular to and in communication with said through hole, said connection hole dimensioned to receive therein a pressing device which comprises a first pressing member, a second pressing member, and a bolt, said first and said second pressing members provided respectively with a threaded hole and a stepped round hole, said first and said second pressing members provided respectively with an arcuate recess having a serrated surface for reinforcing the effect of fastening said head tube with said upright rod of said bicycle front fork.

* * * * *